US007009135B1

(12) United States Patent
Cheah et al.

(10) Patent No.: US 7,009,135 B1
(45) Date of Patent: Mar. 7, 2006

(54) ELECTRODE ALIGNMENT DEVICE FOR AUTOMATED WELDING MACHINES

(75) Inventors: Hui Hua Cheah, Tanjong Bungah (MY); Boon Guan Sow, Melaka (MY); Ze Shen Wong, Sungai Nlibong (MY)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/984,274

(22) Filed: Nov. 9, 2004

(51) Int. Cl.
*B23K 11/31* (2006.01)

(52) U.S. Cl. .................................. 219/86.33; 219/86.9

(58) Field of Classification Search ............. 219/56.1, 219/56.21, 86.33, 86.9, 87, 88
See application file for complete search history.

(56) References Cited

U.S. PATENT DOCUMENTS 3,238,351 A * 3/1966 Hill ............................ 219/56.1
3,275,790 A * 9/1966 Helms ....................... 219/86.9

* cited by examiner

*Primary Examiner*—Clifford C. Shaw
(74) *Attorney, Agent, or Firm*—Hisashi D. Watanabe

(57) ABSTRACT

An electrode alignment device and weld head for automated welding machines includes a base member, a gap wheel, an electrode holder and a coupling rod. The gap wheel includes a plurality of graduations, where each graduation corresponds to a predetermined electrode spacing for an automated welding process. In one embodiment, the graduations in the gap wheel comprise pairs of apertures, with a first aperture for engaging an alignment post on the base member, and a second aperture for engaging an alignment post on the electrode holder. Among the graduations, the spacing between the first and second apertures is different. As such, the electrode spacing may easily and accurately be changed by disengaging the coupling rod, rotating the gap wheel to the proper graduation, and reengaging the coupling rod.

19 Claims, 4 Drawing Sheets

-PRIOR ART-

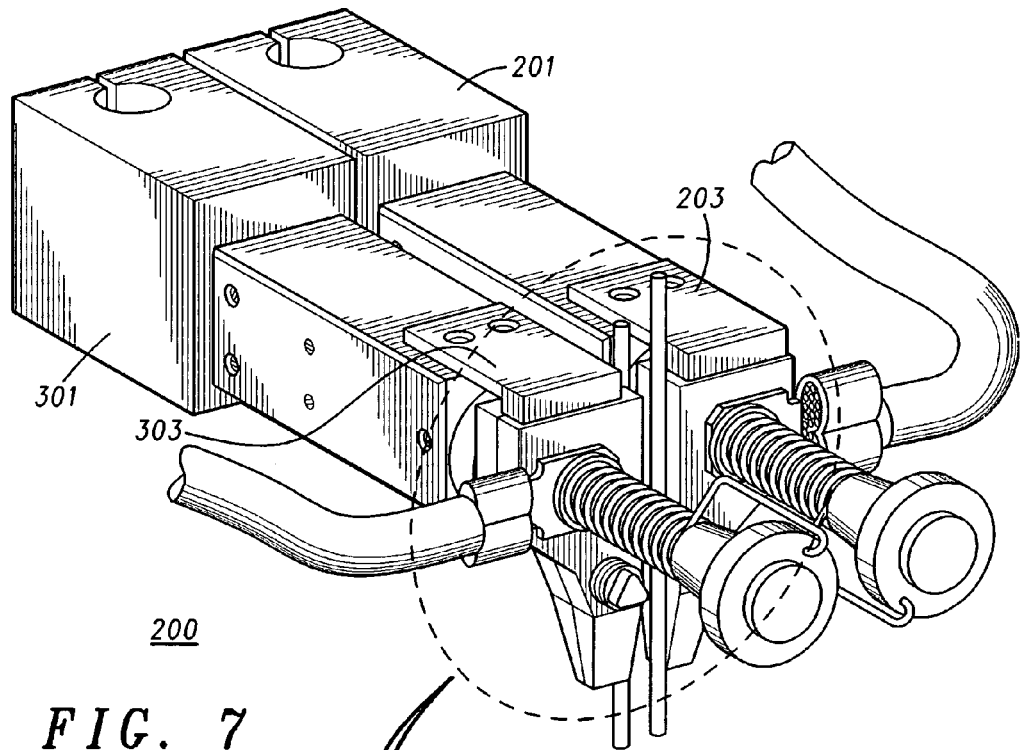
*FIG. 7*
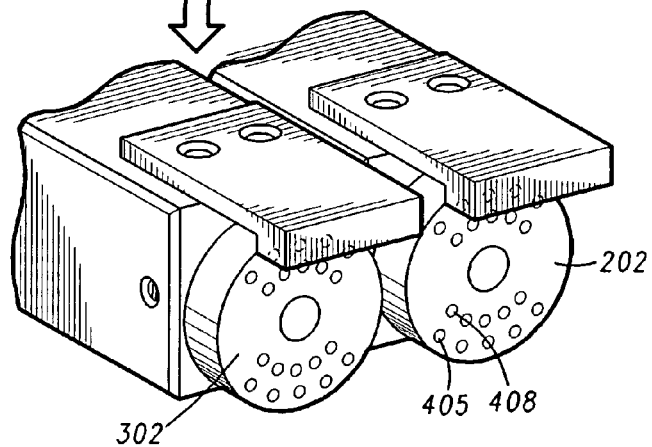

ELECTRODE ALIGNMENT DEVICE FOR AUTOMATED WELDING MACHINES

BACKGROUND

1. Technical Field

This invention relates generally automated welding machines, and more particularly to a quickly-adjustable electrode holder and alignment device for electrical welding machines.

2. Background Art

Many automated manufacturing processes involve welding. One such process is the manufacture of rechargeable battery packs. During the manufacture of these packs, rechargeable cells, which are sometimes packaged in cylindrical, aluminum cans, are welded to flexible, metal tabs. To expedite and automate the process, this weld is frequently applied by an automated welding machine.

Automated welding machines apply welds with a "weld head" that is attached to the machine. Turning now to FIG. 1, illustrated therein is a prior art weld head 100. The weld head 100 consists of a first electrode holder 101 and a second electrode holder 102. The first electrode holder 101 and the second electrode holder 102 hold a first electrode 105 and a second electrode 106, respectively. The first electrode 105 and second electrode 106 are held in place with a first electrode screw 103 and a second electrode screw 104. The spacing between the electrodes is set by a first gap screw 107 and a second gap screw 108.

The weld head 100 creates a weld by sourcing current from the first electrode 105, through the material to be welded, back into the second electrode 106. This current causes certain metal objects along its path to heat to a high enough temperature so as to create a fused weld between components.

The problem with this prior art weld head is that it is very labor intensive and time consuming to adjust the spacing between the electrodes. Large components, for example, may require the electrodes to be several millimeters apart to form a sufficient weld. Small components, by contrast, may require the electrodes to be only tenths of a millimeter apart. For a production line to be capable of manufacturing a variety of products, the electrode gap spacing must be constantly adjusted by an operator.

To adjust the electrode spacing of this prior art weld head, the following steps must occur. First, the operator must go and obtain a wrench for the gap screws 107,108. The operator must then loosen both the left gap screw 107 and the right gap screw 108. The operator must then get a gap gauge, which is a measuring tool to ensure that the electrodes 105,106 are at the right spacing. The operator manually moves the left and right electrode holders 101,102 apart or together until the electrodes match the proper spacing on the gap gauge. Then, without disturbing this sensitive alignment, the operator must retighten the gap screws 107,108.

This electrode adjustment process is both difficult and time consuming. There is thus a need for an improved weld head that facilitates quick and simple adjustments of electrode spacing.

BRIEF DESCRIPTION OF THE DRAWINGS

FIG. 7 illustrates a welding machine in accordance with the invention.

DETAILED DESCRIPTION OF THE INVENTION

Figure 1:
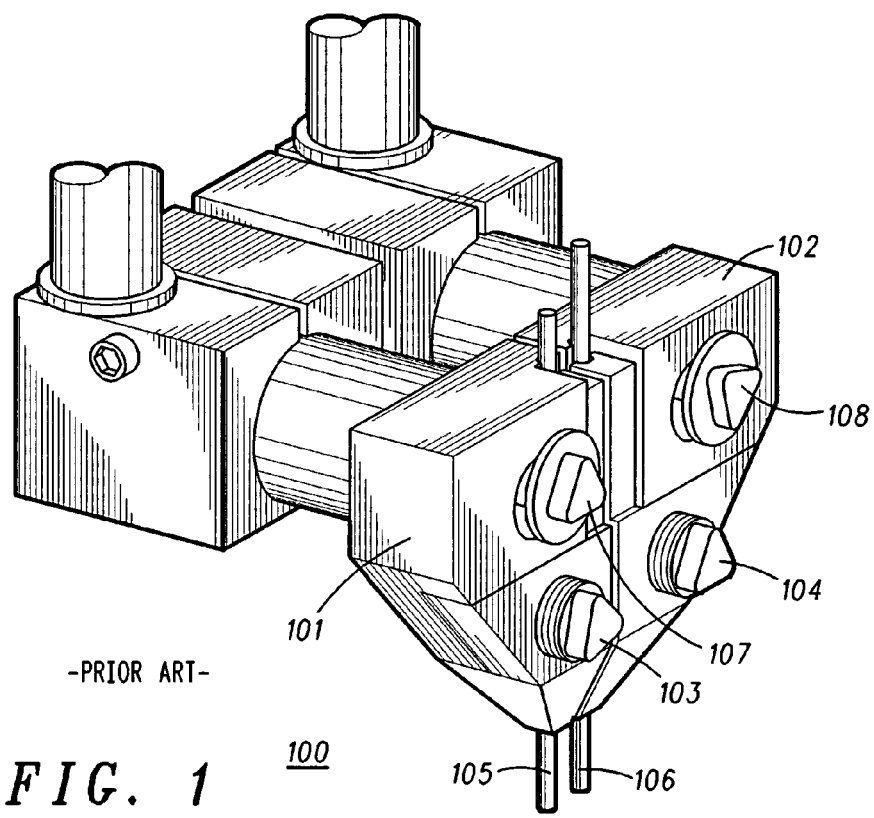
FIG. 1 illustrates a prior art weld head.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a", "an," and "the" includes plural reference, the meaning of "in" includes "in" and "on."

This invention is an improved weld head that includes a base member, a gap wheel, and an electrode holder. A coupling rod mechanically holds the base member, gap wheel and electrode holder together. The gap wheel includes a plurality of graduations, wherein each graduation corresponds to a particular electrode gap spacing. To adjust from one electrode gap spacing to another, an operator simply releases the coupling rod, rotates the gap wheel from a first graduation to a second graduation, and replaces the coupling rod. The rotation of the gap wheel causes the electrode holder to move from a first spacing or alignment to a second spacing or alignment.

Figure 2:
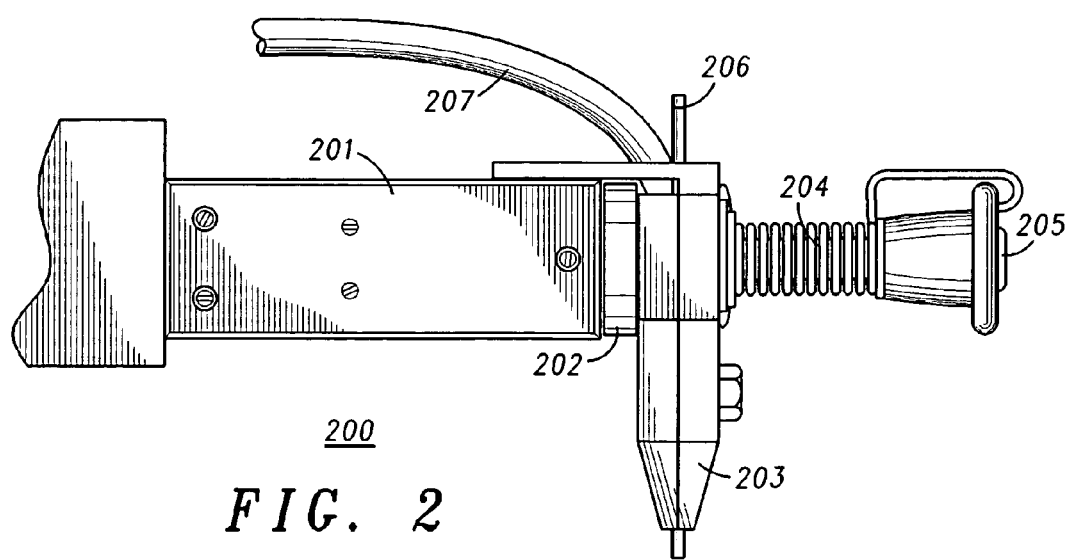
FIG. 2 illustrates a weld head with electrode alignment device in accordance with the invention.

Turning now to FIG. 2, illustrated therein is a weld head 200 in accordance with the invention. The weld head 200 comprises a base member 201 that couples to the welding machine (not shown). An electrode holder 203 holds an electrode 206 in position. A gap wheel 202 is positioned between the base member 201 and the electrode holder 203. The gap wheel 202, electrode holder 203 and the base member 201 are mechanically coupled by way of a coupling rod 204. The coupling rod 204 includes a quick release button 205 for rapidly engaging and disengaging the coupling rod 204 from the base member 201, gap wheel 202 and electrode holder 203.

The gap wheel 202 includes a plurality of graduations, as will be shown in detail below. Each graduation corresponds to a predetermined electrode spacing. For example, one graduation may correspond to an electrode spacing of 0.5 mm, another may correspond to an electrode spacing of 0.8 mm, another may correspond to an electrode spacing of 1.0 mm, another may correspond to an electrode spacing of 1.5 mm, and so forth.

The electrode spacing is quickly and reliably adjusted as follows: One first releases the coupling rod 204 by way of the quick release button 205. This allows the electrode holder 203, gap wheel 203 and base member 201 to be separated. The gap wheel 202 may then be rotated from a first graduation to a second graduation. When the electrode holder 203, gap wheel 202 and base member are then reassembled, the position of the electrode 206 has been adjusted from a first alignment to a second alignment.

Electric current is provided from the machine to the electrode 206 by way of a power cable 207. The power cable 207 a supply path or a return path for current used during the welding process.

Figure 3:
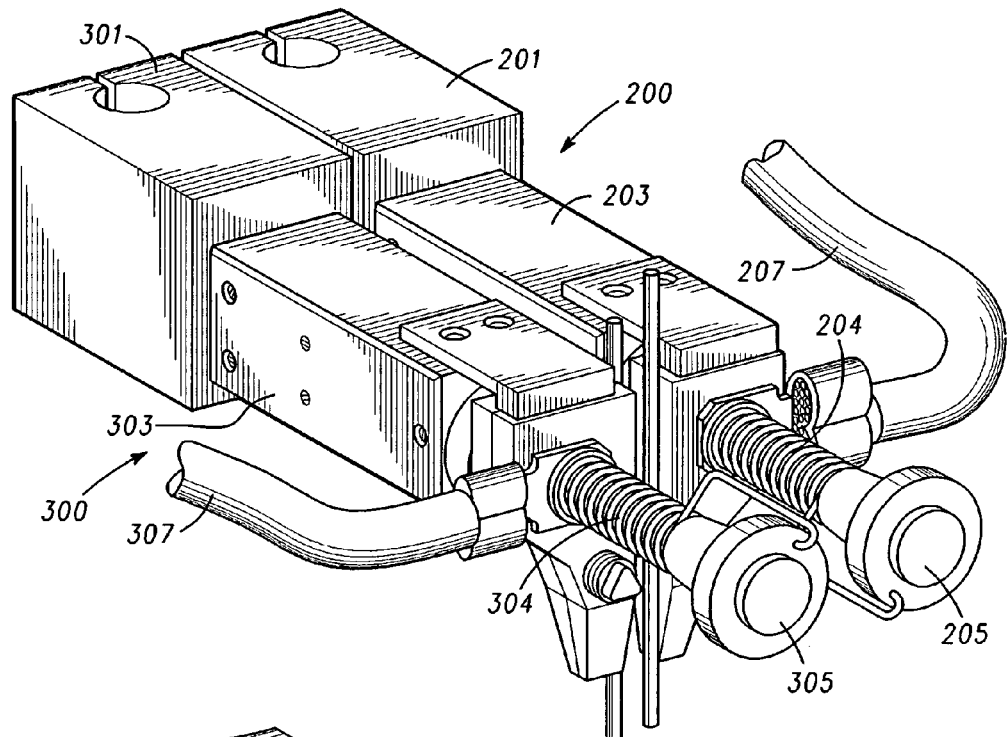
FIG. 3 illustrates a pair of weld heads with electrode alignment devices suitable for coupling to a welding machine in accordance with the invention.

Turning now to FIG. 3, illustrated therein is a pair of two electrode alignment devices 200,300 in accordance with the invention. As mentioned above, welds occur when current flows through one electrode, into the components to be welded, and back into another electrode. As such, welding machines generally employ two electrode alignment devices.

The elements of each electrode alignment device 200,300 are the same as in FIG. 2. They include the base members 201,301 that mechanically couple to the welding machine, and the power cables 207,307 that source and sink the welding current. Electrode holders 203,303 hold the electrodes in place, and coupling rods 204,304 hold the base members 201,301, the gap wheels (hidden in this particular view by the electrode holders 203,303), and the electrode holders 203,303 together. A quick release button 205,305 facilitates engagement and disengagement of the coupling rods 204,304.

Figure 4A:
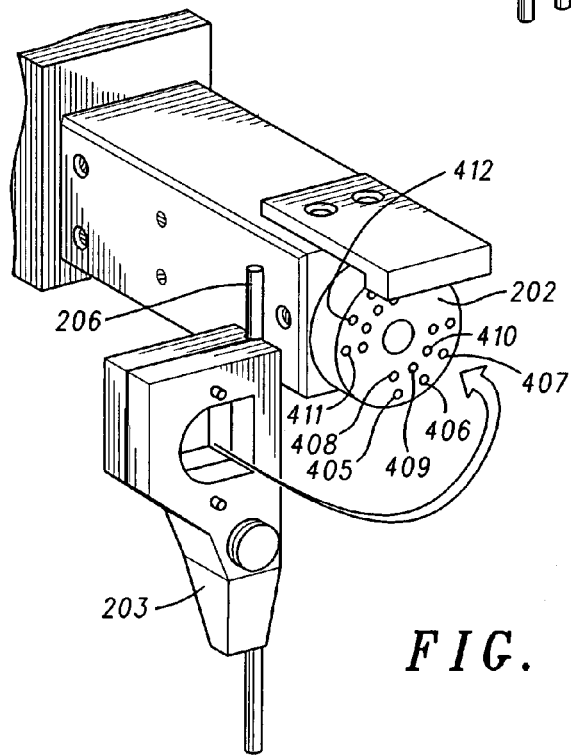
FIGS. 4A and 4B illustrate side views of an electrode alignment device in accordance with the invention.
Figure 4B:
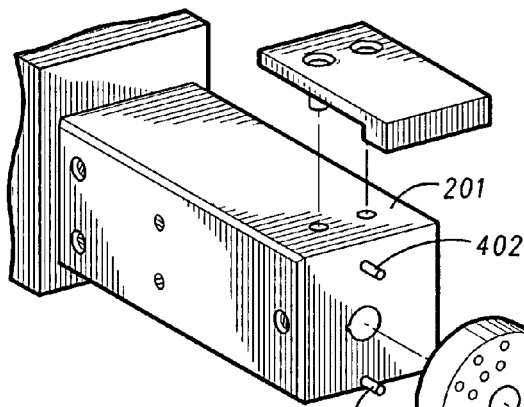

Turning now to FIGS. 4A and 4B, the operation of the gap wheel 201 and its affect on electrode 206 alignment may be more easily seen. FIG. 4A is a front view of the electrode holder 203, the gap wheel 202 and base member 201 when the coupling rod (not shown) has been disengaged and removed. FIG. 4B is a side view of the same.

In one preferred embodiment, the base member 201 includes at least one base member alignment post 401. In this particular embodiment, the base member 201 includes a pair of base member alignment posts 401,402. Similarly, the electrode holder 203 includes at least one electrode holder alignment post 403. In this particular embodiment, the electrode holder 203 includes two electrode holder alignment posts 403,404.

In this particular embodiment, the graduations on the gap wheel 202 comprise a plurality of apertures 405–410 disposed radially across the gap wheel 202. These apertures 405–410 facilitate engagement with the base member alignment post 401. For example, when the gap wheel 202 is rotated to a first position, base member alignment post 401 would engage with, for example, aperture 405. When the gap wheel 202 is rotated to a second position, i.e. it is turned to a second graduation, base member alignment post 401 would engage, for example, with aperture 406. Where two base member alignment posts 401,402 are employed a second set of apertures 411 will be included on the gap wheel 202.

Similarly, a second set of apertures, e.g. 408–410, are provided for engagement with the electrode holder alignment posts 403,404. Continuing with the example above, when the gap wheel 202 is rotated to a first position, electrode holder alignment post 403 may engage with aperture 408. Similarly, when the gap wheel 202 is rotated to a second position, electrode holder alignment post 403 may engage aperture 409. Where, like in this exemplary embodiment, two electrode holder alignment posts 403,404 are employed, a second set of apertures 412 will be disposed radially across the gap wheel 202.

Figure 5:
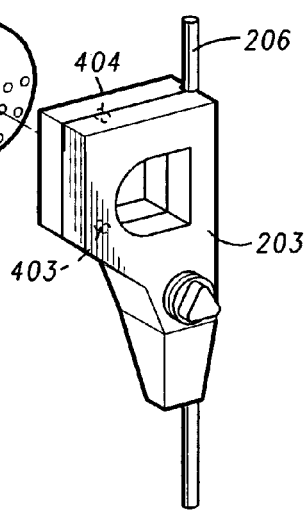
FIG. 5 illustrates the front view of a gap wheel in accordance with the invention.
Figure 5:
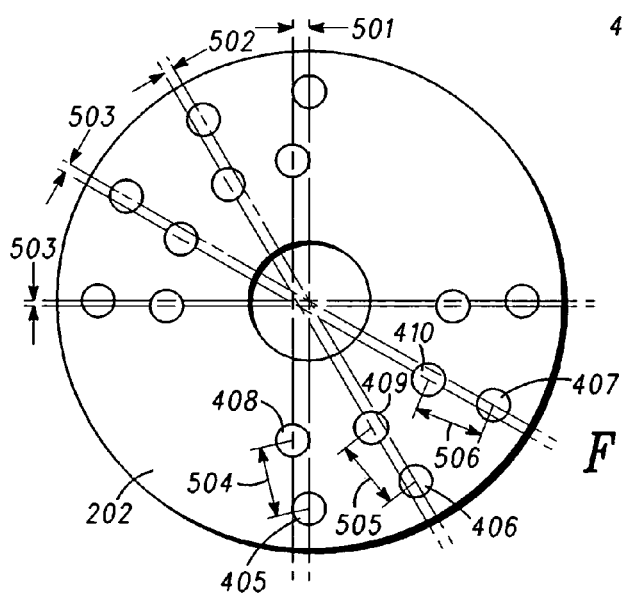

Turning now to FIG. 5, illustrated therein is a front view of the gap wheel 202 which illustrates how the engagement of the electrode holder alignment posts 403,404 affects electrode 206 alignment. Each graduation of this particular embodiment comprises a pair of apertures, a base member alignment post aperture and an electrode holder alignment post aperture. For example, the pair of aperture 405 and 406 comprise one graduation, with aperture 405 serving as the base member alignment post aperture, and aperture 406 serving as the electrode holder alignment post aperture. Apertures 406 and 409 would serve the same function for the second graduation, apertures 407 and 410 for the third and so on.

The electrode spacing is varied among these graduations in that the spacing between the base member alignment post aperture, e.g. 405, and the electrode holder alignment post aperture, e.g. 408, is different among the graduations. For example, spacing 504 is different from 505, which is different from 506, and so forth. As such, each spacing corresponds to a different, predetermined electrode spacing.

The result of these different spacings 504–506 is that when the gap wheel 202 is rotated, the engagement of the electrode holder alignment posts 403,404 and the base member alignment posts 401,402 with the base member alignment post apertures 405–407 and the electrode holder alignment post apertures 408–410, respectively, the electrode 206 coupled to the electrode holder 203 will shift from a one alignment to another.

This is most easily seen by looking at the spacing when measured by lines drawn normal to the diameter of the gap wheel 202. For example, spacing 501 represents the distance between such lines drawn from apertures 405 and 408, respectively, normal to the diameter of the gap wheel. Spacing 501, as is spacing 504, is proportional to a predetermined space between electrodes. For example, spacing 501 may measure 0.75 mm, which corresponds to an electrode spacing of 1.5 mm, as two of the electrode holders will be employed in the welding machine.

Similarly, spacing 502 corresponds to, and is proportional to, a second electrode spacing. For example, spacing 502 may measure 0.5 mm, which corresponds to an electrode spacing of 1.0 mm. Spacing 503 may measure 0.4 mm, which corresponds to an electrode spacing of 0.8 mm. It will be clear to those of ordinary skill in the art having the benefit of this disclosure that any spacing less than the radius of the gap wheel may be employed. Experimental results have shown that useful spacings for the assembly of rechargeable battery packs are 1.5 mm, 1.0 mm, 0.8 mm and 0.5 mm. The predetermined electrode spacing is established by disposing the electrode holder alignment post 401 within the electrode alignment aperture, e.g. 405, and by disposing the base member alignment post 403 within the base member alignment aperture, e.g. 408.

Figure 6:
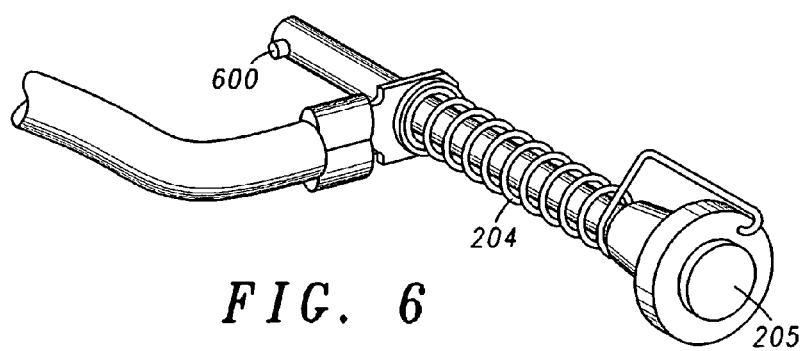
FIG. 6 illustrates a coupling rod in accordance with the invention.

Turning now to FIG. 6, illustrated therein is an exemplary coupling rod 204. In this preferred embodiment, the coupling rod 204 includes at least one retractable engagement protrusion 600. The retractable engagement protrusion 600 is retractable by actuating the quick release button 205 on the end of the coupling rod 204. When this occurs, the coupling rod 204 disengages with the base member 201, thereby allowing the base member 201, gap wheel 202 and electrode holder 203 to be separated so that the gap wheel may be rotated from one graduation to another.

Turning now to FIG. 7, illustrated therein is a welding machine 700 comprising a pair of electrode alignment devices 200,300 in accordance with the invention. Each of the electrode alignment devices 200,300 includes a gap wheel 202,302 comprising a plurality of graduations, where each graduation corresponds to a predetermined electrode spacing. The electrode alignment devices 200,300 also include base members 201,301 and electrode holders 303. When either gap wheel 202,302 is rotated from a first position to a second position, the respective electrode holder 203,303 to moves from a first alignment to a second alignment.

In the embodiment of FIG. 7, the graduations each comprise a first aperture, e.g. 405 and a second aperture, e.g. 408. The base members 201,301 each include at least one base member alignment post (not shown in this view) that is capable of engaging the first aperture, e.g. 405, of either gap wheel 202,302. The electrode holders 203,303 each comprise at least one electrode holder alignment post (not shown in this view) capable of engaging the second aperture, e.g. 408, of either gap wheel 202,302. The predetermined electrode spacing is established by disposing the at least one electrode holder alignment post within the first aperture and by disposing the at least one base member alignment post within the second aperture.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the graduations of the embodiments recited herein comprise pairs of apertures, other means of demarking graduations, including gears, protrusions, detents and latches may equally be used.

What is claimed is:

1. An alignment device for a welding machine, comprising:
   a base member comprising at least one base member alignment post;
   an electrode holder comprising at least one electrode holder alignment post; and
   a gap wheel comprising a plurality of base member alignment apertures configured to receive the at least one base member alignment post and a plurality of electrode alignment apertures configured to receive the at least one electrode holder alignment post.

2. The device of claim 1, further comprising a coupling rod for mechanically coupling the base member, electrode holder and gap wheel together.

3. The device of claim 2, wherein the coupling rod comprises at least one retractable engagement protrusion.

4. The device of claim 3, wherein the coupling rod comprises a release button capable of retracting the at least one retractable engagement protrusion.

5. An alignment device for a welding machine, comprising:
   a base member comprising at least one base member alignment post;
   an electrode holder comprising at least one electrode holder alignment post; and
   a gap wheel comprising a plurality of graduations, each graduation corresponding to a predetermined electrode spacing;
   wherein each graduation comprises a pair of apertures.

6. The device of claim 5, wherein each pair of apertures has a space there between, wherein the space between the pair of apertures is proportional to a space between electrodes.

7. The device of claim 5, wherein the pair of apertures comprises an electrode alignment aperture and a base member alignment aperture.

8. The device of claim 7, wherein the predetermined electrode spacing is established by disposing the at least one electrode holder alignment post within the electrode alignment aperture and by disposing the at least one base member alignment post within the base member alignment aperture.

9. The device of claim 5, wherein any one of the plurality of graduations corresponds to a predetermined electrode spacing selected from the group consisting of 0.5 mm, 0.8 mm, 1.0 mm, and 1.5 mm.

10. An electrode alignment device, comprising:
    a. a base member comprising at least one base member alignment post;
    b. an electrode holder comprising at least one electrode holder alignment post; and
    c. a gap wheel comprising at least a first and second base member alignment post apertures and at least a first and second electrode holder alignment post apertures;
    wherein the distance between the first base member alignment post aperture and the first electrode holder alignment post aperture is different from the distance between the second base member alignment post aperture and the second electrode holder alignment post aperture.

11. The device of claim 10, further comprising a coupling rod, wherein the coupling rod mechanically couples the base member, the electrode holder and the gap wheel together.

12. A welding machine, comprising at least two electrode alignment devices, each electrode alignment device comprises:
    a. a gap wheel comprising a plurality of graduations, each graduation corresponding to a predetermined electrode spacing;
    b. a base member;
    c. an electrode holder;
    wherein when the gap wheel is rotated from a first position to a second position, the electrode holder to moves from a first alignment to a second alignment.

13. The machine of claim 12, wherein the plurality of graduations each comprise a first aperture and a second aperture.

14. The machine of claim 13, wherein the base member comprises at least one base member alignment post capable of engaging the first aperture.

15. The machine of claim 14, wherein the electrode holder comprises at least one electrode holder alignment post capable of engaging the second aperture.

16. The device of claim 15, wherein the predetermined electrode spacing is established by disposing the at least one electrode holder alignment post within the first aperture and by disposing the at least one base member alignment post within the second aperture.

17. The machine of claim 16, wherein each electrode alignment device further comprises a coupling rod, wherein the coupling rod mechanically couples the base member, the electrode holder and the gap wheel together.

18. An electrode alignment device for a welding machine, comprising:
    a. a gap wheel, the gap wheel comprising a first plurality of apertures disposed radially across the gap wheel, and a second plurality of apertures disposed radially across the gap wheel;
    b. a base member, the base member comprising a first pair of alignment posts capable of coupling to the first plurality of apertures;
    c. an electrode holder, the electrode holder comprising a second pair of alignment posts capable of coupling to the second plurality of apertures; and d. a coupling rod for mechanically coupling the gap wheel, base member and electrode holder together;

wherein when the gap wheel is rotated into a first position, the fist pair of alignment posts engage the first plurality of apertures and the second pair of alignment posts engage the second plurality of apertures so as to cause the electrode holder to be in a first position;

further wherein when the gap wheel is rotated into a second position, the first pair of alignment posts engage the first plurality of apertures and the second pair of alignment posts engage the second plurality of apertures so as to cause the electrode holder to be in a second position.

19. The electrode holder of claim 18, wherein either the first position or the second position is selected from the group consisting of an electrode spacing of 0.5 mm, 0.8 mm, 1.0 mm, and 1.5 mm.

* * * * *